United States Patent
Furukawa et al.

(10) Patent No.: US 8,909,561 B2
(45) Date of Patent: Dec. 9, 2014

(54) INFORMATION PROCESSING APPARATUS AND INFORMATION PROCESSING METHOD

(75) Inventors: Daisuke Furukawa, Koganei (JP); Kenji Morita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 353 days.

(21) Appl. No.: 12/879,781

(22) Filed: Sep. 10, 2010

(65) Prior Publication Data
US 2011/0131158 A1 Jun. 2, 2011

(30) Foreign Application Priority Data

Nov. 30, 2009 (JP) ................... 2009-272570

(51) Int. Cl.
*G06F 15/18* (2006.01)
*G06K 9/62* (2006.01)
*G06K 9/00* (2006.01)

(52) U.S. Cl.
CPC .......... *G06K 9/00993* (2013.01); *G06K 9/6228* (2013.01)
USPC .......................................................... 706/12

(58) Field of Classification Search
USPC .......................................................... 706/12
See application file for complete search history.

(56) References Cited

U.S. PATENT DOCUMENTS

| 5,638,492 | A  | * | 6/1997 | Maeda et al. ............ 706/45 |
| 8,144,943 | B2 | * | 3/2012 | Yashiro et al. .......... 382/118 |
| 8,238,652 | B2 | * | 8/2012 | Ono ........................ 382/165 |
| 2001/0042068 | A1 | * | 11/2001 | Yoshida et al. ............ 707/102 |
| 2006/0210141 | A1 | * | 9/2006 | Kojitani et al. ............ 382/141 |
| 2009/0157707 | A1 | * | 6/2009 | Ito et al. .................... 707/100 |
| 2010/0103476 | A1 | * | 4/2010 | Yashiro ...................... 358/464 |

FOREIGN PATENT DOCUMENTS

| JP | 2002-230549 A | 8/2002 |
| JP | 2005-100121 A | 4/2005 |

* cited by examiner

*Primary Examiner* — Kakali Chaki
*Assistant Examiner* — Ababacar Seck
(74) *Attorney, Agent, or Firm* — Canon USA Inc. IP Division

(57) ABSTRACT

An information processing apparatus that selects a plurality of feature amounts acquired by applying a filter to learning data and generates a discriminator based on the selected feature amounts includes a time specification unit configured to specify a calculation time required for acquiring a feature amount of a selection candidate by applying the filter to the selected feature amounts or the learning data, a precision specification unit configured to specify a precision of a discriminator generated based on the feature amount of the selection candidate and the selected feature amounts, a selection unit configured to select the feature amount of the selection candidate based on the calculation time and the precision, and a generation unit configured to generate the discriminator based on the selected feature amounts.

12 Claims, 9 Drawing Sheets

FIG. 2B

| FILTER NAME | CALCULATION AMOUNT |
|---|---|
| FILTER A | 2 |
| FILTER B | 4 |
| FILTER C | 3 |
| FILTER D | 1 |
| FILTER E | 3 |
| FILTER F | 2 |

INFORMATION PROCESSING APPARATUS AND INFORMATION PROCESSING METHOD

BACKGROUND OF THE INVENTION

1. Field of the Invention

The present invention relates to an information processing apparatus configured to extract a plurality of feature amounts from image data and to input the feature amounts to a discriminator to discriminate the feature of the image data.

2. Description of the Related Art

Recently, a discrimination processing technology is used for selectively detecting only a specific region from image data, e.g., the face detection or the lesion detection in a medical image.

With the technology, a plurality of feature amounts is acquired by combining a plurality of filters that can emphasize a partial region of an image, such as maximum/minimum filters or Wavelet, for a plurality of learning images. Further, a discriminator is trained by applying the acquired plurality of feature amounts to a predetermined learning algorithm. Herein, the discriminator indicates a series of calculation methods for inputting data on a plurality of feature amounts by a plurality of filters to be applied to an unknown image, and outputting a discrimination result. The learning algorithm can be AdaBoost or Support Vector Machine (SVM).

Upon generating the discriminator for discrimination processing, the selection of the feature amount as an input is important because the input in the learning step greatly contributes to generalization capability, i.e., discrimination precision of the discriminator. In addition, processing for applying a filter to an image mainly shares the time required for the discrimination processing. In particular, the discrimination with proper allowable precision is necessary in practical use, thus the selection of the filter, i.e., the selection of the feature amount is particularly important.

Upon selecting data on the feature amount used for the discriminator, the processing for applying the filter to the image can be duplicated. For example, filters A and B extract one feature amount X and the filters A and B and a filter D extract another feature amount Y. The processing using the filters A and B is duplicative, the duplication is not however considered, and a calculation time of the generated discriminator is not thus precisely evaluated.

SUMMARY OF THE INVENTION

According to an aspect of the present invention, an information processing apparatus that selects a plurality of feature amounts acquired by applying a filter to learning data and generates a discriminator based on the selected feature amounts includes a time specification unit configured to specify a calculation time required for acquiring a feature amount of a selection candidate by applying the filter to the selected feature amounts or the learning data, a precision specification unit configured to specify a precision of a discriminator generated based on the feature amount of the selection candidate and the selected feature amounts, a selection unit configured to select the feature amount of the selection candidate based on the calculation time and the precision, and a generation unit configured to generate the discriminator based on the selected feature amounts.

According to an exemplary embodiment of the present invention, the calculation time is evaluated by preventing duplication processing and the discriminator is generated. As a consequence, the calculation time is precisely evaluated and the discriminator is generated.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2B is a table illustrating a calculation amount of each filter.

DESCRIPTION OF THE EMBODIMENTS

Various exemplary embodiments, features, and aspects of the invention will be described in detail below with reference to the drawings.

According to a first exemplary embodiment of the present invention, a description is given of an information processing system that performs processing for sequentially selecting a feature amount from learning data and generating a discriminator by applying the SVM to the feature amount and processing for discriminating the feature amount by applying the trained discriminator to unknown data. In the generation processing of the discriminator, a calculation time is evaluated in consideration of duplication processing upon calculating the feature amount. In the discrimination processing, the feature amount is generated from the unknown data by preventing the duplication processing.

Figure 1:
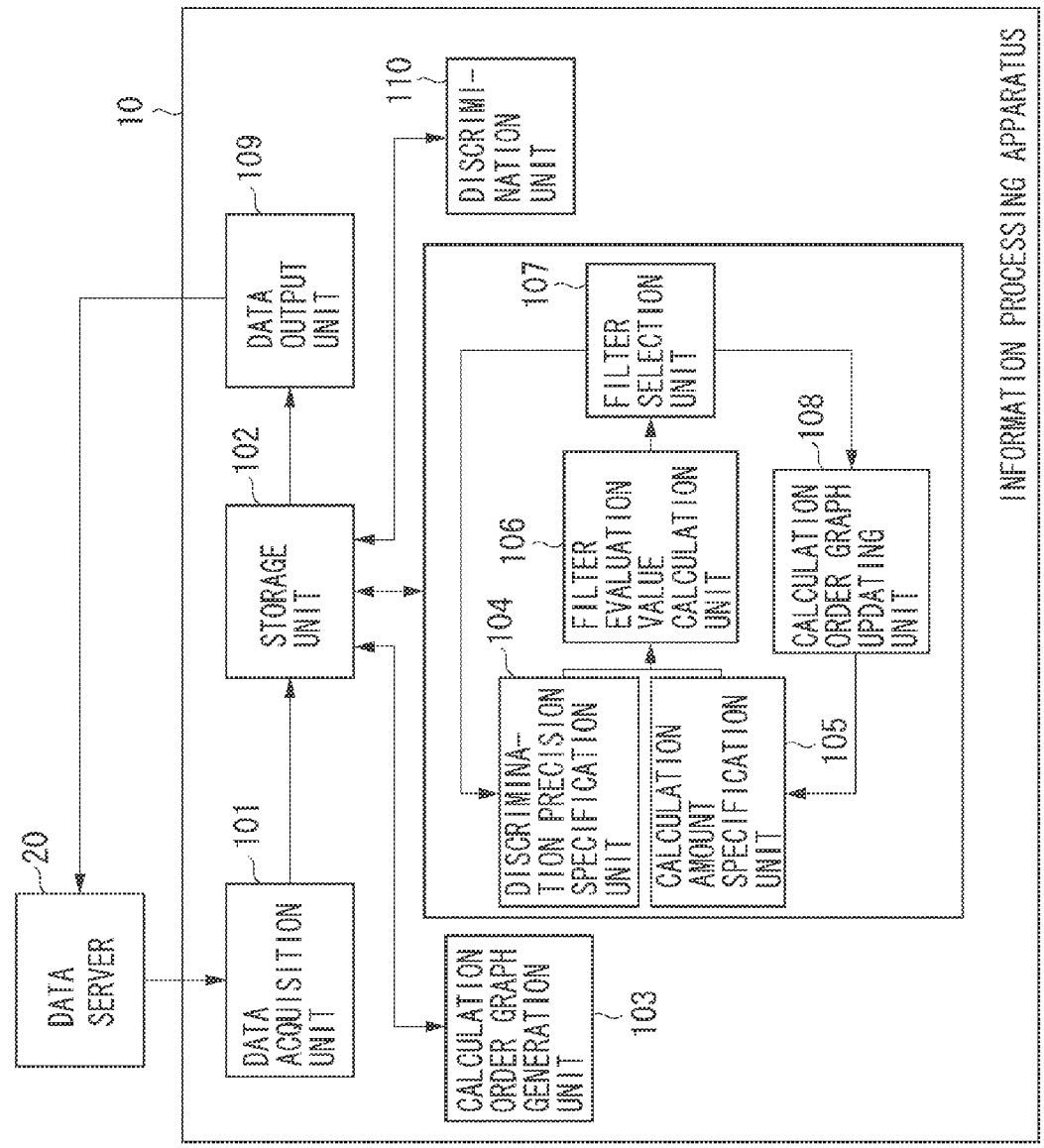
FIG. 1 illustrates a configuration of an information processing system according to a first exemplary embodiment of the present invention.

Hereinbelow, a description is given of the configuration of the information processing system that executes the processing according to the first exemplary embodiment with reference to FIG. 1. The information processing system includes an information processing apparatus 10 and a data server 20. The information processing apparatus 10 is connected to the data server 20 via an interface. The interface for connection may be a local area network (LAN), IEEE1394, optical fiber, or USB.

The data server 20 stores a set of learning images and a set of filters. The set of learning images and the set of filters are transmitted to the information processing apparatus 10 in response to a request of the information processing apparatus 10. The data server 20 stores a set of filters selected by the information processing apparatus 10. The set of learning images corresponds to captured images including the face of a person, and also corresponds to learning data for generating a discriminator that discriminates a face image of the person from the image. The set of filters corresponds to spatial filters that generate a feature amount including an edge, an average pixel value, or the number of specific shapes, e.g., a transformation matrix, from the image data.

The information processing apparatus 10 includes the following units, that is, a data acquisition unit 101, a storage unit 102, a calculation order graph generation unit 103, a discrimination precision specification unit 104, a calculation amount specification unit 105, a filter evaluation value calculation unit 106, a filter selection unit 107, a calculation order graph updating unit 108, a data output unit 109, and a discrimination unit 110.

With this configuration, the data acquisition unit 101 acquires a set of learning images and a set of filters from the data server 20, and stores the acquired sets in the storage unit 102. The calculation order graph generation unit 103 constructs a calculation order graph from the set of filters stored in the storage unit 102. The calculation order graph is data expressed with a tree structure as a relationship between a filter application order to the original image and a feature amount that is sequentially acquired by the order. The data is also stored in the storage unit 102. The details of the calculation order graph will be described below.

The discrimination precision specification unit 104 calculates discrimination precision of each filter by using the learning data stored in the storage unit 102. The discriminator is generated based on the already selected feature amounts and a feature amount of a selection candidate indicated in the calculation order graph, and the discrimination precision is calculated based on a number of correct discriminations and a number of erroneous discriminations as a result of applying the generated discriminator to all learning data.

The calculation amount specification unit 105 specifies the calculation amount by using the calculation order graph generated by the calculation order graph generation unit 103. The calculation amount means a time required for acquiring the feature amount from the original image. Loads of reading the image and processing for storing the feature amount in the storage unit 102 are sufficiently smaller than that of the filter application processing of the image. Therefore, the calculation amount may be a time required for the filter application processing.

The filter evaluation value calculation unit 106 calculates an evaluation value used for selecting the feature amount and the filter, based on the discrimination precision specified by the discrimination precision specification unit 104 and the calculation amount specified by the calculation amount specification unit 105. The filter selection unit 107 selects the feature amount and the filter based on the evaluation value for selecting the feature amount and the filter. The storage unit 102 stores the selected feature amount and filter. The calculation order graph updating unit 108 updates the calculation amount stored in the calculation order graph based on the filter selected by the filter selection unit 107. The selected feature amount and the feature amount acquired in the processing for calculating the feature amount are specified from the calculation order graph, and the calculation amounts of the feature amount are set to 0. The filter selection unit 107 further selects the feature amount and the filter based on the evaluation of the calculation amount. This is because, if the procedure for generating two or more feature amounts has a common portion, it is possible to prevent the duplication of the processing of the common portion. This processing will be described below.

The data output unit 109 transmits information on the filter stored in the storage unit 102 to the data server 20. The discriminator includes the spatial filter and a parameter upon applying the filter.

The discrimination unit 110 acquires an unknown image that is not included in the set of learning images from the storage unit 102. Simultaneously, the discrimination unit 110 acquires the set of selection filters as the set of filters selected by the filter selection unit 107 and the selection order thereof. The discrimination unit 110 then performs the discrimination processing by using the set of selection filters. When one feature amount corresponds to feature amounts acquired by sequentially applying the filters A, B, and C in the order thereof and another feature amount corresponds to feature amounts acquired by sequentially applying the filters A, B, and D in the order thereof, the storage unit 102 stores the application result of the filters A and B upon calculating the one feature amount. The feature amount as the stored application result is used for calculating the other feature amount. When a procedure for calculating two or more feature amounts are partly common, the feature amount of the common portion is stored upon calculating the one feature amount and is used for calculating the other feature amount, thereby preventing the duplication of the processing. Thus, the feature amount of the common portion needs to be subjected to the storage processing. However, the time required for the storage processing is sufficiently shorter than the time required for applying the spatial filter to the image. Therefore, the time required for the discrimination processing can be reduced.

The discrimination result is stored in the storage unit 102. The data output unit 109 outputs information on the discrimination result stored in the storage unit 102 to the external data server 20.

Figure 2A:
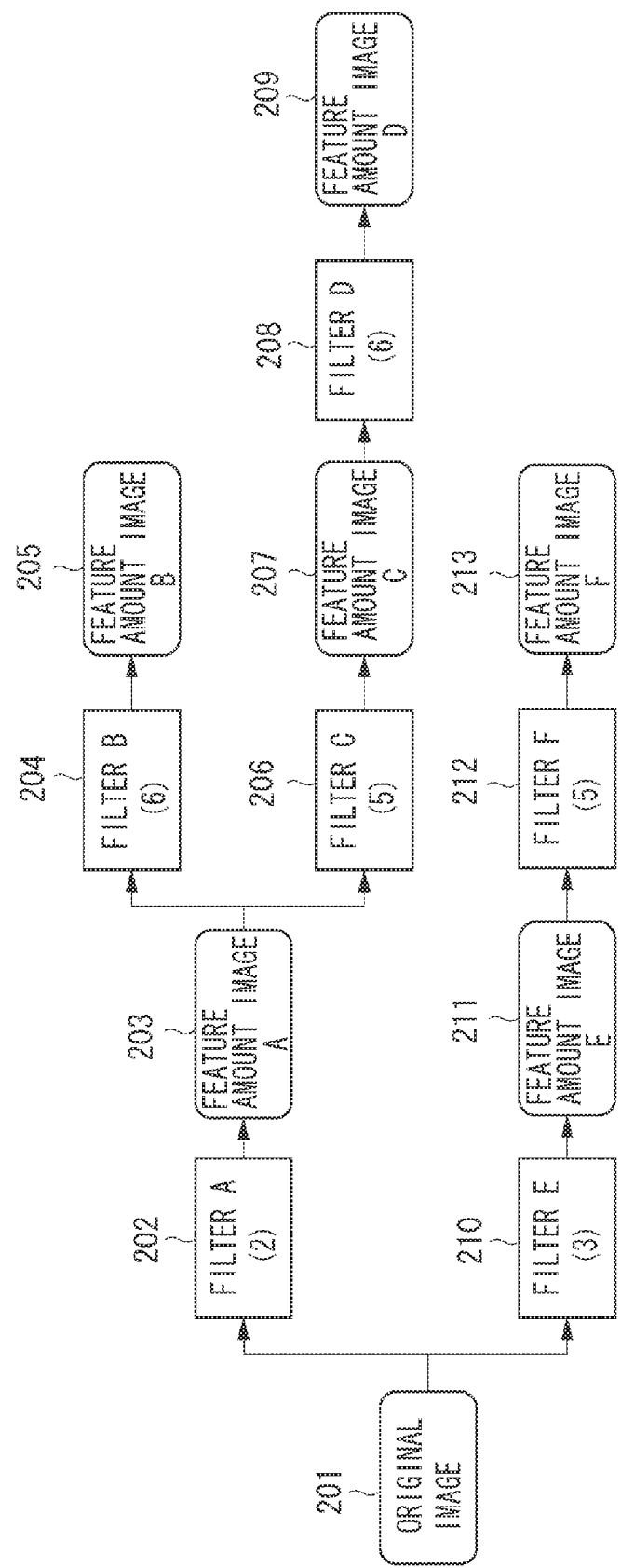
FIG. 2A is a diagram illustrating a calculation order graph stored in a storage unit.

A description is given of images on the learning data stored in the data server 20 in the information processing system and the data structure of the spatial filter and the feature amount with reference to FIGS. 2A and 2B. The calculation order graph indicates data with a tree structure that is valid upon specifying the calculation amount in consideration of the filter application order and the already calculated feature amount image. In the following description, the filter selection means the selection of the filter and the feature amount image acquired as a result using the selected filter.

The calculation order graph expresses, with data with a tree structure, a relationship between the filter applied to the image and the feature amount image as the output result of the filter (refer to FIG. 2A). One graph includes two types of nodes having a node indicating the image and a node indicating the filter. Referring to FIG. 2A, nodes 201, 203, 205, 207, 209, 211, and 213 indicate image nodes, and nodes 202, 204, 206, 208, 210, and 212 indicate filter nodes. An arrow directed to the filter node indicates an input to the filter, and an arrow output from the filter node indicates an output from the filter. In the case of the filter node 202, the original image is an input to the filter A, and an output thereof is a feature amount image A, i.e., the feature amount image A is output by applying the filter A to the original image. Further, an image output from one filter can be input from another filter. With a relationship between the image node 203 and the filter nodes 204 and 206, one image can be inputs from a plurality of filters. When the feature amount image or learning image as the input is equal to the feature amount image as the output, the same filter node is used.

The filter node is stored, with not only the name of the corresponding filter but also the calculation time required for applying the filter, i.e., the calculation time of the feature amount in association therewith. Referring to FIG. 2A, a numeral in parenthesis in the filter node indicates the calculation amount. The calculation amount indicates the entire calculation time necessary for ending the calculation of the target filter from the application of the first filter to the input image. A specific description is given with reference to FIG. 2B. FIG. 2B illustrates the calculation amount of each filter with respect to the filters illustrated in FIG. 2A. It is understood that the filter A is applied to the original image, and the required calculation time is 2 to output the feature amount image A. Further, the filter B is applied to the feature amount image A, and the calculation time needs 4 to apply the feature amount image B.

The calculation amount held by the filter node in the calculation order graph is easily determined from the calculation amount of each filter. For example, the calculation amount stored in the filter node 204 is a value (2+4=6) acquired by adding 4 as the calculation amount required to apply the filter B to the feature amount image A to 2 as the calculation amount required to apply the filter A to the original image. Similarly, the calculation amount stored in the filter node 208 is (2+3+1=6), and the calculation amount stored in the filter node 212 is (3+2=5). The use of the above-constructed calculation order graph enables efficient acquisition of the time required for the order and calculation of the filter applied during the time period in which the original image is given and the target filter outputs the feature amount image. The calculation order graph is not limited to this and may be data with a tree structure acquired by using only the feature amount image as the node and the spatial filter as an edge (link). Further, the calculation order graph may be data with a tree structure acquired by using only the filter as the node.

The calculation amount stored in the filter node is updated according to the calculated feature amount image every time the filter selection processing selects one filter. Although the details are described below, according to the present exemplary embodiment, the filter is selected based on an index acquired by combining the extraction precision and the calculation amount. However, for a brief description, the details of the filter selection are not described here and the updating of the calculation amount is focused and described upon selecting the filter.

Figure 3A:
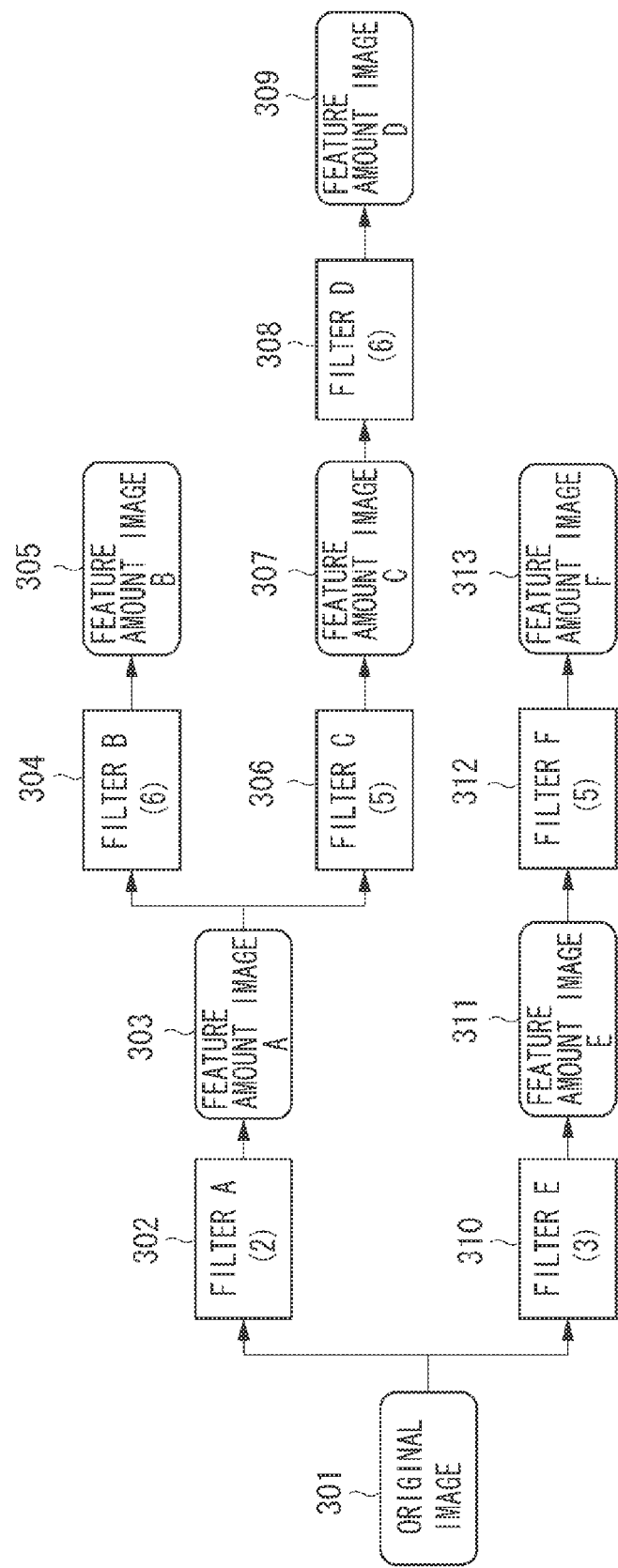
FIGS. 3A and 3B are diagrams schematically illustrating operation based on calculation order graphs upon selecting a feature amount.
Figure 3B:
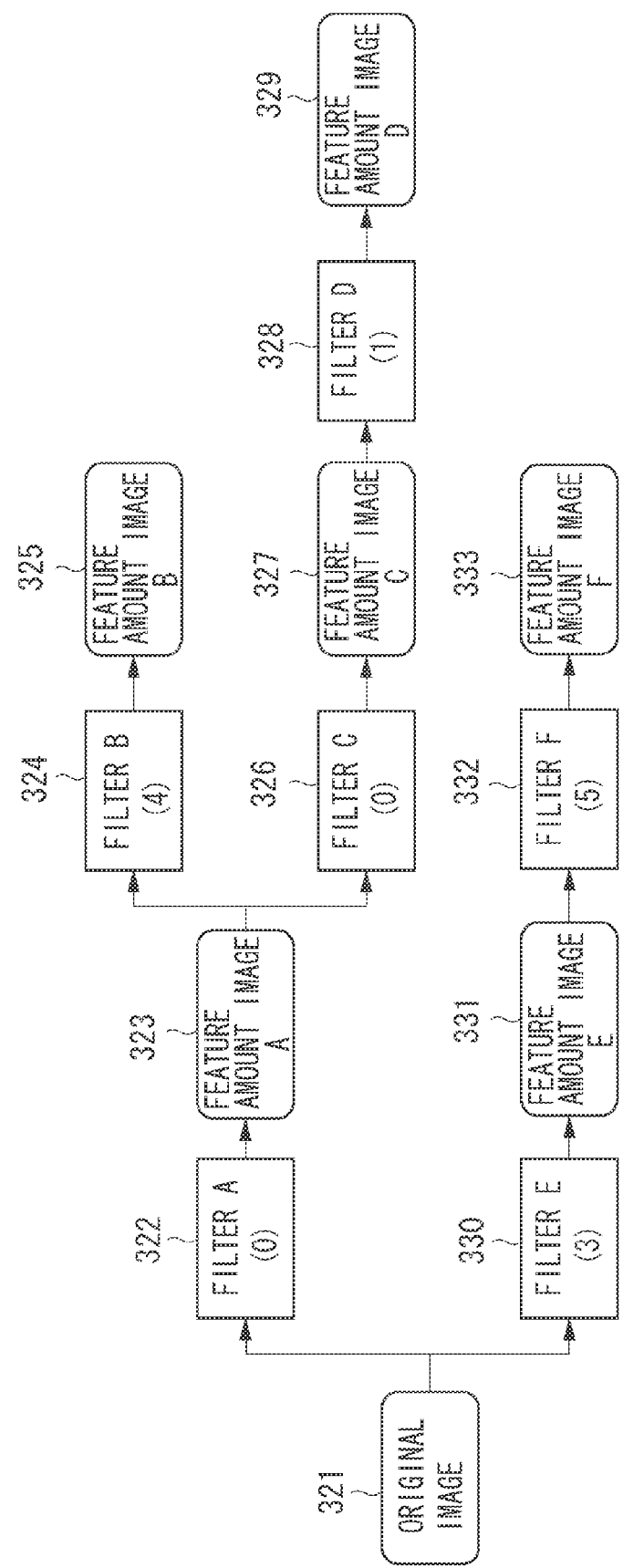

A description is given of the outline of operation of data on the calculation time of the feature amount with reference to FIGS. 3A and 3B. FIG. 3A illustrates the calculation order graph in the situation in which any filters are not selected. In the situation, it is assumed that the filter C is selected as the first one. A consideration is given of processing for actually generating a feature amount image C as an output result of the filter C. With reference to the calculation order graph in FIG. 3A, an input image of the filter C is the feature amount image A. Therefore, at the pre-step of calculating the filter C, the filter A needs to be applied to the original image to acquire the feature amount image A. On the contrary, in the step of generating the feature amount image C as the output result of the filter C, it means that the calculation of the filter A already ends and the feature amount image A as the output thereof is already generated. Then, the generated feature amount image A is stored in a storage region and the feature amount image A stored in the storage region is used when the calculation of the filter A is required. Then, it is considered that the filter A does not need to be calculated after that. Under the consideration, the calculation amounts of the filter nodes 302 and 305 in the calculation order graph are set to 0.

Further, the input image of the filter B is also the feature amount image A with reference to the calculation order graph in FIG. 3A. As described above, the feature amount image A generated upon applying the filter C can be used as the input image of the filter B. Therefore, the calculation amount of the filter B can be reduced. The calculation amount stored in the filter node 304 is 6 in the calculation order graph. This value is acquired by adding 2 as the calculation amount of the single filter A to 4 as the calculation amount of the single filter B. Since the feature amount image A can be reused now, the calculation amount of the filter A is 0. Therefore, the calculation time required for calculating the feature amount image B from the input image is equal to the calculation amount of the single filter B. Then, the filter node 304 stores a value 4 acquired by subtracting 2 as the calculation amount stored in the filter node 302 from 6 as the calculation amount originally stored in the filter node 304.

In the summarization of the foregoing, upon selecting the filter C as the first one, 0 as the calculation amount is stored in the filter nodes 302 and 306 in the calculation order graph, and 4 as the calculation amount is stored in the filter node 304. FIG. 3B illustrates a graph after selecting the filter C in the graph in FIG. 3A. The amounts of calculation of filter nodes 322 and 326 corresponding to the filters A and C are 0 and the calculation amount of the filter node 304 corresponding to the filter B is 4.

Upon selecting the second or subsequent filter, the calculation amount stored in the calculation order graph is also updated based on the similar method.

The above-mentioned data updating processing enables proper evaluation of the calculation amount upon selecting the feature amount or the filter.

Figure 4:
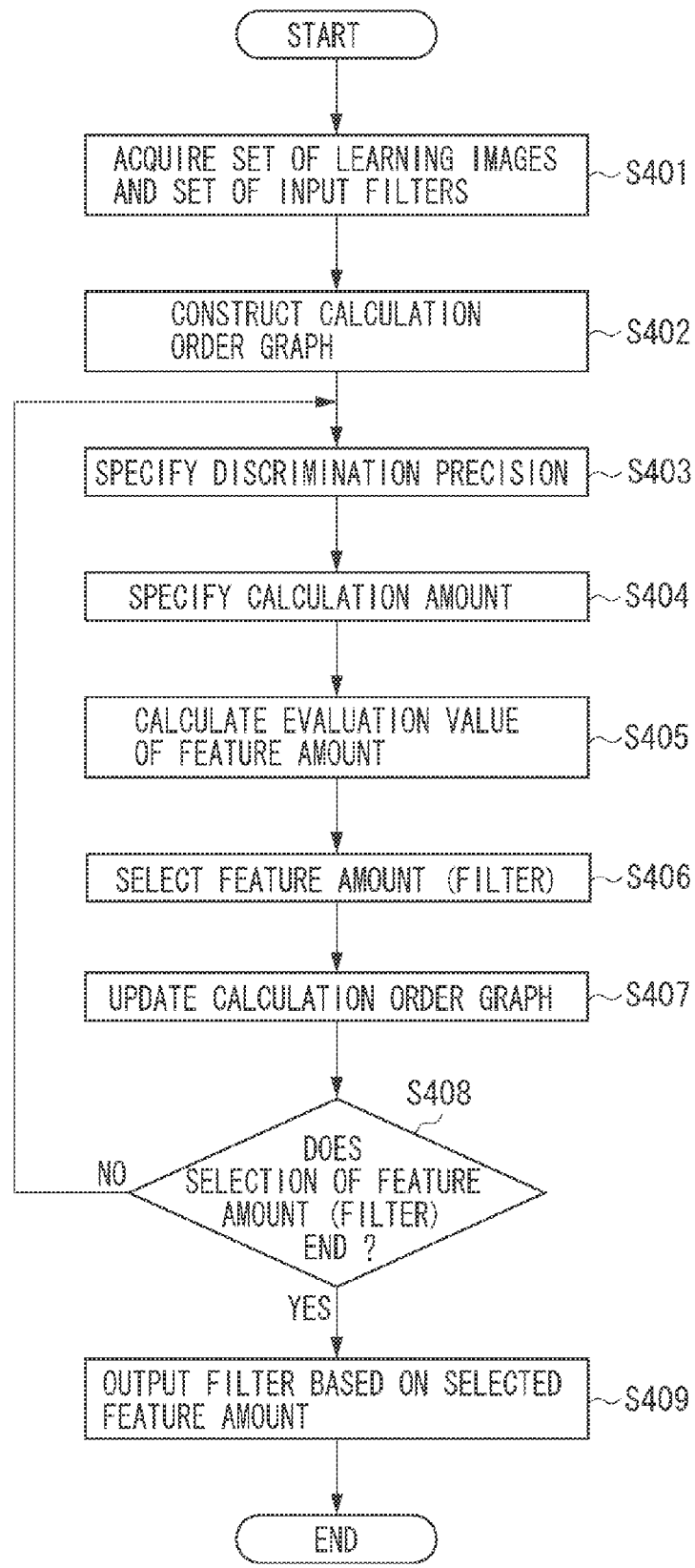
FIG. 4 is a flowchart illustrating a flow of generation processing of a discriminator by the information processing apparatus.

A specific description is given of processing of the discriminator executed by the information processing apparatus 10 having the above configuration with reference to a flowchart in FIG. 4.

In step S401, the data acquisition unit 101 acquires the set of learning images and the set of filters for input from the data server 20, and stores the acquired sets in the storage unit 102. The set of learning images includes a plurality of images for evaluating the extraction precision of the filter and a label image acquired by adding a label to only a specific region to be extracted in each image. According to the first exemplary embodiment, a pixel value 1 is set to pixels included in a region to be extracted in the label image and a pixel value 0 is set to pixels in the other region.

The set of filters for input is the original set when the information processing apparatus 10 selects the filter, including a large number of filters for suppressing noises and filters for emphasizing a region as an extraction target. A filter effective to extract the region varies depending on the input image and the feature of the region to be extracted. Therefore, the type of filter stored in the set of filters for input is experimentally determined depending an application fact. A unique number indicating an input/output image is given to the filter stored in the set of filters for input.

In step S402, the calculation order graph generation unit 103 constructs the calculation order graph. First, the set of filters for input is acquired from the storage unit 102, thereby generating the calculation order graph. The filter stored in the set of filters for input holds a unique number indicating the input/output image. The use of the number enables easy generation of a graph with a well-known algorithm. Since the graph is generated once throughout the entire processing, the graph can be manually generated in advance.

Next, the calculation amount to be stored in the filter node is acquired based on the generated calculation order graph. To accomplish the acquisition, the calculation amount of the single filter is acquired. The calculation amount of the single filter corresponds to the processing time from the input of the image to the output of the application result of the filter. The processing time is acquired by actually applying the filter to each image included in the learning data, measuring the processing time required for every image, and further averaging the processing times. After acquiring the calculation amount of the single filter, the calculation amount is stored in the filter node in the calculation order graph, from the constructed calculation order graph and the calculation amount of the single filter. Since the description is already given of the method for acquiring the calculation amount stored in the filter node, this is not iteratively mentioned.

In step S403, the discrimination precision specification unit 104 reads the set of learning images and the set of filters for input stored in the storage unit 102, and specifies the discrimination precision of the filters included in the set of filters for input. The discrimination precision of the filter is determined by extracting the region of each image in the set of learning images and comparing the extracted region with the region as an extraction target in the corresponding label image. Hereinbelow, a description is given of a procedure for determining the discrimination precision by the support vector machine (SVM) and then using the determination result with filters $f^{[1]}, \ldots, f^{[t-1]}$ selected by the (t−1)-th iterative processing in steps S203 to S207 and one filter $f_i$ in the set of filters for input.

Figure 5:
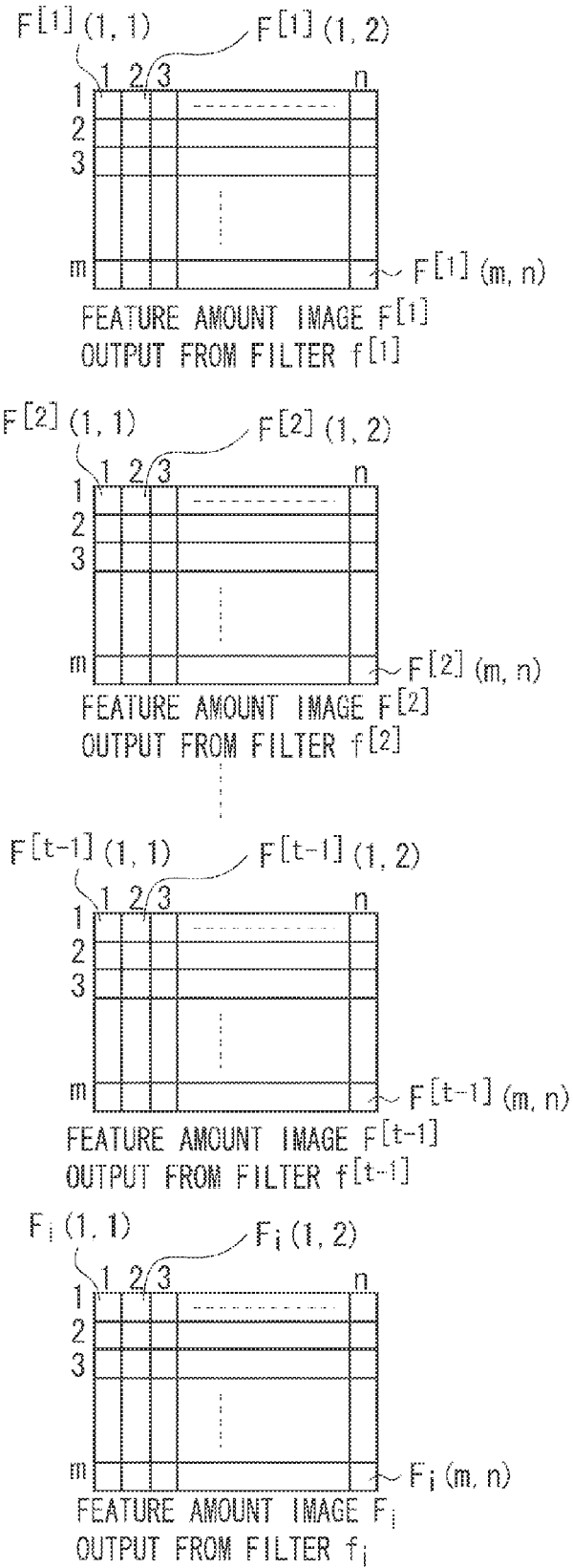
FIG. 5 is a diagram illustrating feature amount images with a support vector machine (SVM).

The support vector machine (SVM) is one of learning algorithms for the discrimination as whether a d-dimensional vector x belongs to any of two classes (e.g., 1 and −1). Since the learning algorithm of the SVM is well known, a description thereof is omitted. The input and output of the support vector machine are described. The SVM requires, as inputs, a set $(x_i, y_i)$ of n d-dimensional vectors $x_i$ and a class $y_i$ to which the vector $x_i$ belongs, and a kernel type and a parameter in the discrimination. First, according to the first exemplary embodiment, with respect to the set, the vector $x_i$ has, as a component, pixel values of feature amount images $F^{[1]}, \ldots, F^{[t-1]}, F_i$ output from the filters $f^{[1]}, \ldots, f^{[t-1]}, f_i$. A specific description is given with reference to FIG. 5. The vector $x_i$ is as follows.

$$x_1 = (F^{[1]}(1,1)F^{[1]}(1,1) \ldots F^{[t-1]}(1,1)F_i(1,1))$$

$$x_2 = (F^{[1]}(1,2)F^{[2]}(1,2) \ldots F^{[t-1]}(1,2)F_i(1,2))$$

...

$$x_{m \times n} = (F^{[1]}(m,n)F^{[2]}(m,n) \ldots F^{[t-1]}(m,n)F_i(m,n))$$

Herein, $F^{[t]}(x,y)$ indicates a value at coordinate values (x,y) of the feature amount image $F^{[t]}$. To one piece of data of the learning image, the vectors corresponding to the number of pixels of the image are generated. Since the number of the generated vectors is L corresponding to the number of pieces of the data on the learning image, the actual number of the vectors is m×n×L.

In the SVM, there are inputs of the feature amount image, the type of discrimination function and a parameter thereof used for discrimination, a pre-image included in the set of learning images, and a correct image (label image) corresponding thereto, and also outputs of a discrimination function. The discrimination function is applied to all data on the learning image, thereby calculating the discrimination precision in comparison with the correct image.

The discrimination method may be simple threshold processing of the feature amount image as the output result of the filter or a region extraction method using Mahalanobis' generalized distance value calculated from the feature amount image. Alternatively, the discrimination method may be a region extraction method using only the feature amount image output from the filter $f_i$ or a region extraction method executed with combination of the feature amount images generated by the filters $f^{[1]}, \ldots, f^{[t-1]}, f_i$.

All filters included in the set of filters for input are subjected to the above-described processing, thereby acquiring the discrimination precision of the filter or the feature amount.

In step S404, the calculation amount specification unit 105 acquires a calculation amount $T^{[t]}_i$ of the filter from the corresponding filter node in the calculation order graph, for each filter $f_i$ in the set of filters for input.

In step S405, the filter evaluation value calculation unit 106 calculates the filter evaluation value from the discrimination precision and the calculation amount of the filter specified in steps S403 and S404. The filter evaluation value is determined from the discrimination precision and the calculation amount. As the value is smaller, the filter is effective in viewpoint of the discrimination precision and the calculation amount. Although various values are available as the filter evaluation value, the first exemplary embodiment uses a filter evaluation value calculated by a weighted linear sum of the calculation amount and the calculation precision, as illustrated in the following formula.

$$F^{[t]}_i = w_1(1-P^{[t]}_i) + (1-w_1)T^{[t]}_i \qquad (1)$$

Herein, $P^{[t]}_i$ and $T^{[t]}_i$ are respectively the discrimination precision and the calculation amount of the filter $f_i$, and $w_1$ is a weight coefficient between the discrimination precision and the calculation amount, determined in advance depending as whether attention is paid to the discrimination precision or the calculation amount.

The available filter evaluation value is not limited to formula (1) and may be a filter evaluation value defined by the following formulae.

$$F^{[t]}_i = \frac{w_2 P^{[t]}_i}{1 + T^{[t]}_i} \qquad (2)$$

$$F^{[t]}_i = P^{[t]}_i \exp(-w_3 T^{[t]}_i) \qquad (3)$$

In step S406, the filter selection unit 107 selects one filter based on the filter evaluation value $F^{[t]}_i$ calculated in step S405. The filter selection unit 107 simply selects the filter having the smallest value of $F^{[t]}_1$. The storage unit 102 stores the selected filter $f^{[t]}$.

In step S407, the calculation order graph updating unit 108 updates the calculation amount stored in the filter node of the calculation order graph based on the filter selected in step S407. Since the method for updating the calculation amount is already described, the description thereof is omitted.

In step S408, the filter selection unit 107 ends the filter selection processing in steps S403 to S407. When a number t of the selected filter is a threshold $N_{iter1}$ for a number of iterative times or more, the processing ends and then proceeds to step S409. On the other hand, when the number t of filters is smaller than $N_{iter1}$, 1 is added to the number t and the processing then returns to step S403, in which the filter selection processing continues.

In step S409, the data output unit 109 reads the set of selection filters $f^{[1]}, \ldots, f^{[Niter1]}$ from the storage unit 102, and outputs the read set to the external data server 20.

Figure 6:
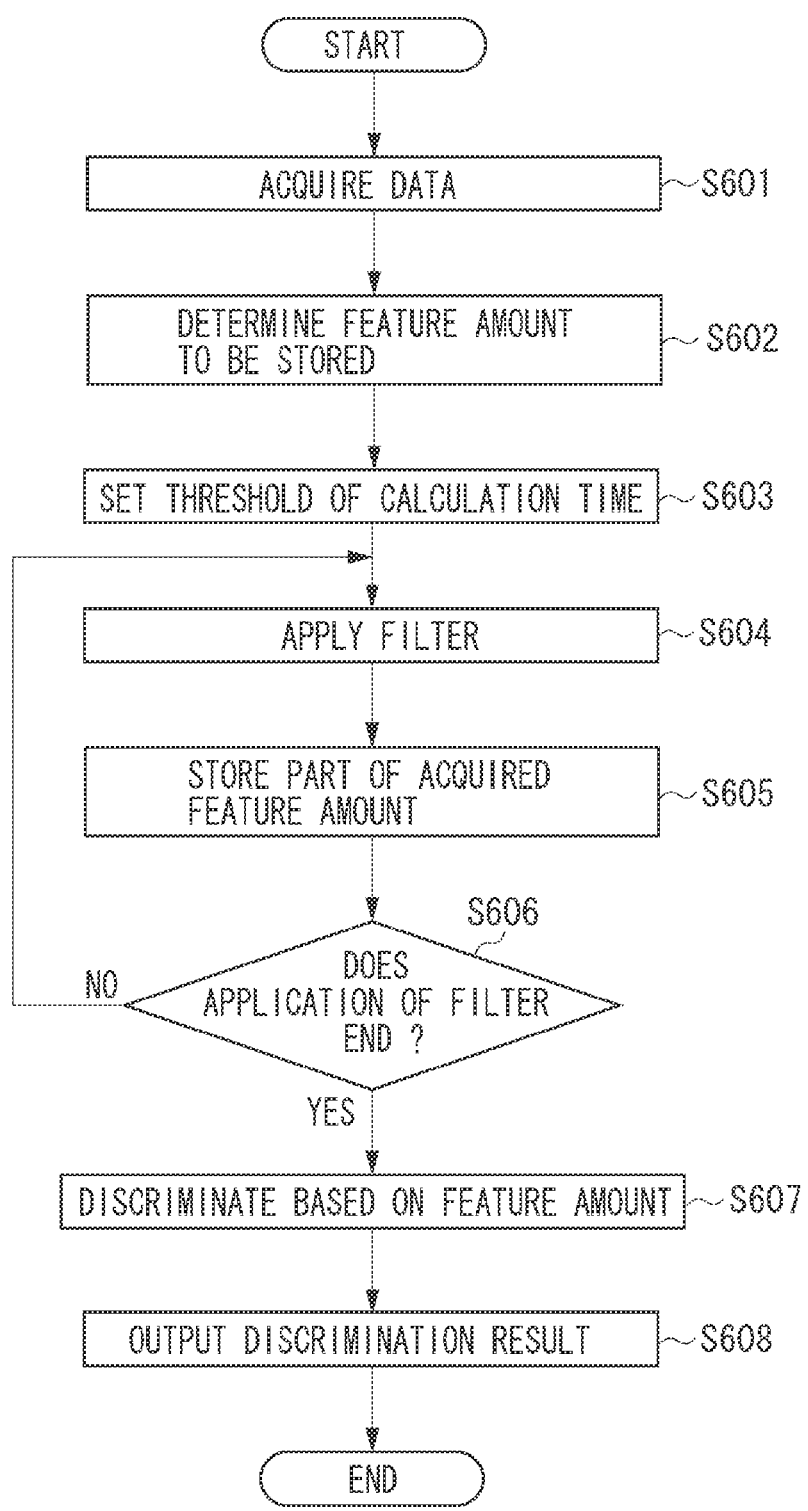
FIG. 6 is a flowchart illustrating a flow of discrimination processing of unknown data by the information processing apparatus.

A description is given of the details of discrimination processing of unknown data, executed by the information processing apparatus 10 having the configuration with reference to a flowchart in FIG. 6. The information processing apparatus 10 according to the first exemplary embodiment outputs the selection order of the filter in addition to the set of selection filters. The discrimination unit 110 sequentially applies the filter to an unknown image that is not included in the set of learning images in order thereof, and performs the discrimination processing by using the feature amount image as the output result. The discrimination unit 110 has a function for ending the application of the filter based on a calculation time $T_{limit2}$ that is determined in advance by an operator of the information processing apparatus 10. Thus, the information processing apparatus 10 according to the first exemplary embodiment can discriminate the unknown image that is not included in the set of learning images within the range of the calculation time that is determined in advance with high discrimination precision.

In step S601, the discrimination unit 110 acquires, from the storage unit 102, an image I as a discrimination target, the set of selection filters $f^{[1]}, \ldots, f^{[Niter1]}$, and filter calculation amounts $T^{[1]}, \ldots, T^{[Niter1]}$ specified in the filter selection processing.

In step S602, the discrimination unit 110 determines the feature amount to be stored in the storage unit 102. The discrimination unit 110 determines, by referring to the calculation order graph, whether there is a common portion of the generation process of each feature amount. When a feature amount X is acquired by applying the filters A, B, and C and a feature amount Y is acquired by applying the filters A, B, and D, the discrimination unit 110 determines that a feature amount Z acquired by applying the filters A and B is to be stored in the generation process of the feature amount X. As described above, the discrimination unit 110 determines the feature amount to be stored with respect to all feature amounts. The discrimination unit 110 stores the determination result in the storage unit 102 to enable referencing the determination result upon generating the feature amount.

In step S603, the discrimination unit 110 sets an upper limit $T_{limit2}$ for the processing time of the filter calculation. The upper limit $T_{limit2}$ may be determined by a user input or a defined value. Next, the discrimination unit 110 sequentially integrates the filter calculation amount starting with $T^{[1]}$. The discrimination unit 110 compares the integration value with $T_{limit2}$, thereby finding a filter $f^{[Niter2]}$ that is more than $T_{limit2}$. When the filter is found, the discrimination unit 110 excludes subsequent filters $f^{[Niter2+1]}, \ldots, f^{[Niter1]}$ from the set of selection filters.

In step S604, the discrimination unit 110 applies the filter $f^{[1]}$ to the image I, and generates the feature amount image $F^{[1]}$. In the processing, all feature amounts acquired in the generation processing are stored in a temporary memory (not illustrated). In step S605, the discrimination unit 110 checks, by referring to the information in the storage unit 102, whether there is the feature amount to be stored in the generation processing, picks up and stores the feature amount to be stored from the temporary memory, and discards an unnecessary feature amount. In step S606, the discrimination unit 110 determines whether the generation of all feature amount images ends. When the generation of all feature amount images does not end (NO in step S606), the processing proceeds to step S604, in which the next feature amount image is generated. In the u-th iterative processing, the feature amount image generated in step S606 is described as $F^{[u]}$. When the generation of all images with the feature amount ends (YES in step S606), the processing proceeds to step S607. With the above-described processing, the discrimination unit 110 applies the filters $f^{[1]}, \ldots, f^{[Niter2]}$ to the image I, and generates the feature amount images $F^{[1]}, \ldots, F^{[Niter2]}$.

In step S607, the discrimination unit 110 performs the discrimination processing by using the generated feature amount images $F^{[1]}, \ldots, F^{[Niter2]}$. The discrimination unit 110 performs the discrimination processing by using the discriminator trained with AdaBoost in the flowchart in FIG. 7. The discrimination method may be any well-known discrimination method, such as a method based on the Mahalanobis' generalized distance value described in step S203 according to the first exemplary embodiment or the method using the support vector machine (SVM).

In step S608, the data output unit 109 acquires the data specified by the discrimination unit 110 from the storage unit 102, and outputs the acquired data to the external data server 20.

With the above-described configuration, the information processing apparatus 10 according to the first exemplary embodiment can perform the discrimination processing with high precision within a range of a condition of the calculation time of the feature amount image that is determined in advance for the unknown image that is not included in the set of learning images. Therefore, "although the precision is low, the discrimination is to end for a short time" or "although a certain time is required, the discrimination is expected with high precision", that is, the discrimination processing can be implemented under conditions of the time and the precision.

With the discrimination processing, the feature amount and the number of filters are limited by using the filter application time stored in the calculation order graph. The present invention is not limited to this and, alternatively, the time may be determined while executing the generation processing of the feature amount. In this case, the discrimination unit 110 acquires the time required for the filter application processing by actually applying the filter included in the set of selection filters to the image. Then, it is determined, based on the acquired passage time, whether the application of the filter continues or ends. Thus, with the information processing apparatus according to the first exemplary embodiment, the unknown image that is not included in the set of learning images can be discriminated with high discrimination precision within a range of the calculation time that is determined in advance.

More specifically, when ending the execution of step S603, the discrimination unit 110 starts to count the time. In step S606, the discrimination unit 110 acquires the time required for the filter application processing by the time, and determines whether the time is more than a time threshold. When the time is not more than the time threshold (NO in step S606), the processing proceeds to step S604, in which the feature amount is generated. When the time is more than the time threshold (YES in step S606), the generation processing of the feature amount then ends, and the discrimination may be performed with the already generated feature amount. In step S606, the time required for the filter application processing and the application time of the next filter may be acquired from the calculation order graph, may be added to each other, and the discrimination unit 110 may determine the branch of the processing, based on whether the time is more than the threshold. The discrimination processing can be implemented in response to the request to the actual discrimination time by cutback processing with the actual processing time.

A description is given of an example in which the feature amount is sequentially selected from the learning data, processing for generating the discriminator is performed by applying AdaBoost to the selected feature amount, and the feature is discriminated by applying the trained discriminator to unknown data according to the second exemplary embodiment of the present invention. According to the first exemplary embodiment, a predetermined time threshold is set in the generation processing, and the generation processing of the discriminator is performed to prevent the time from being more than the threshold. As a consequence, the discriminator is generated to prevent the time from being more than the requested discrimination time. Although the configuration of an information processing system for executing the processing is similar to that in FIG. 1, processing executed by functional blocks is different from that according to the first exemplary embodiment.

Figure 7:
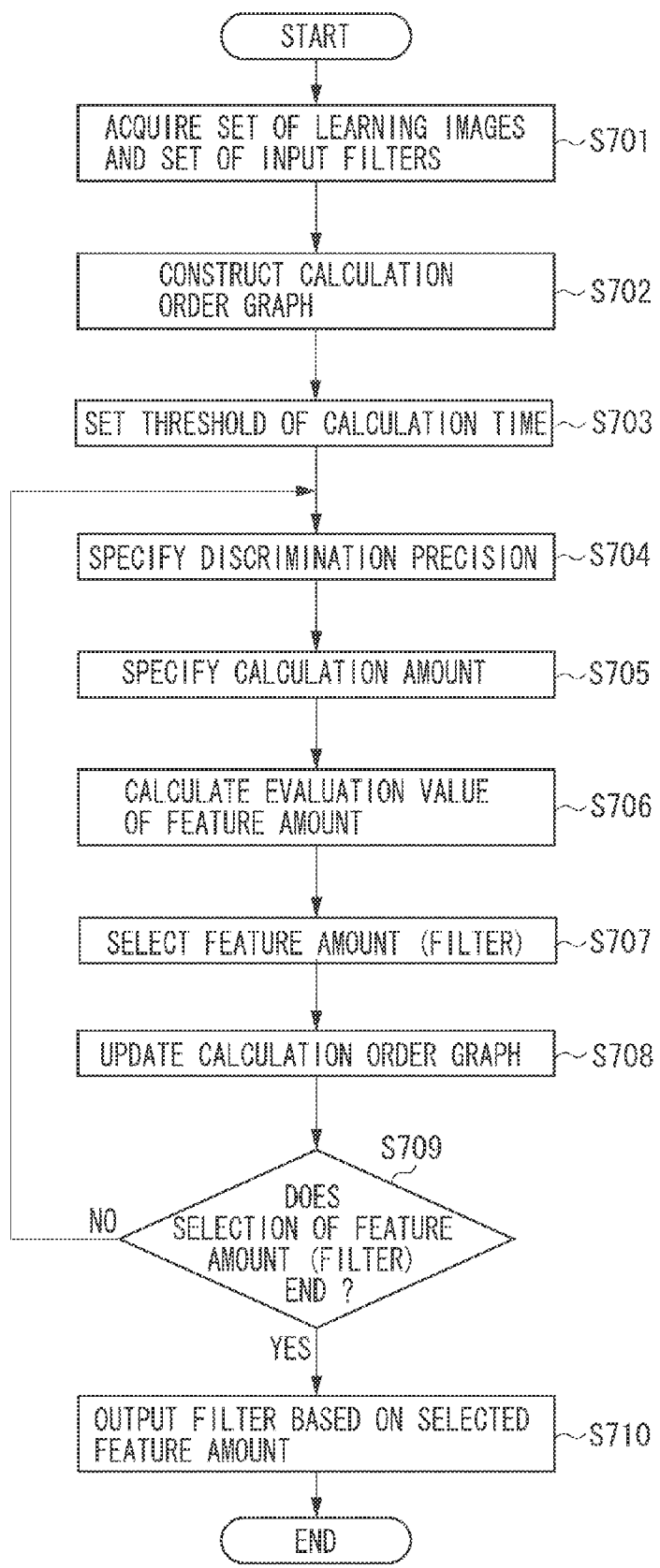
FIG. 7 is a flowchart illustrating a flow of generation processing of a discriminator by an information processing apparatus according to a second exemplary embodiment of the present invention.

A description is given of the generation processing of the discriminator executed by an information processing apparatus 10 according to the second exemplary embodiment with reference to FIG. 7. A description is omitted of similar processing according to the first exemplary embodiment.

Similarly to the information processing apparatus according to the first exemplary embodiment, the information processing apparatus according to the second exemplary embodiment selects the optimum filter in consideration of both the filter calculation order and the calculation amount. In addition, according to the second exemplary embodiment, upon selecting the filter from the set of filters for input, the information processing apparatus estimates the time required for calculating the filter upon executing the discrimination processing of the unknown image. When the sum of the estimated calculation time is more than the time $T_{limit1}$ that is determined in advance, the filter selection ends. Thus, the time required for the discrimination processing of the unknown image can be determined upon selecting the filter. According to the second exemplary embodiment, with AdaBoost as the learning algorithm, the feature amount is selected and the discriminator is generated.

In step S703, the data acquisition unit 101 sets $T_{limit1}$ from the data server 20, and stores $T_{limit1}$ in the storage unit 102. The set value may be determined by a user input or by using a predetermined value.

In step S704, the discrimination precision specification unit 104 calculates the discrimination precision of the filter based on a weight $D^{[t]}(x)$ given to each pixel of the image stored in the set of learning images upon specifying the discrimination precision of the filter. Hereinbelow, a specific description is given.

First, the feature amount image $F_i(x)$ generated by the filter $f_i$ is binarized with a threshold $S^{[t]}_i$, and a binary image $h^{[t]}_i(x)$ is generated.

$$h^{[t]}_i(x) = \begin{cases} 1 & F_i(x) \geq S^{[t]}_i \\ -1 & \text{otherwise} \end{cases} \quad (4)$$

Attention is paid that the binary image $h^{[t]}_i(x)$ and the feature amount $F_i(x)$ are given to each image stored in the set of learning images and one threshold $S^{[t]}_i$ is given to one filter.

Next, an error rate $\epsilon^{[t]}_i$ of the filter $f_i$ is calculated from $h^{[t]}_i(x)$ and a label image $L(x)$ stored in the set of learning images.

$$\epsilon^{[t]}_i = \sum_{h^{[t]}_i(x) \neq L(x)} D^{[t]}(x) \quad (5)$$

With formula (5), the sum of $D^{[t]}(x)$ is acquired for a pixel of $h^{[t]}_i(x) \neq L(x)$ among pixels of the image included in the set of learning images. In the case of AdaBoost, with the label image $L(x)$, a value of 1 is stored in a pixel to be extracted and a value of −1 is stored in another pixel. The weight $D^{[1]}(x)$ is initialized with a total number $N_{voxels}$ of pixels of the image included in the set of learning images.

$$D^{[1]}(x) = \frac{1}{N_{voxels}} \quad (6)$$

A discrimination precision $P^{[t]}_i$ is calculated from the error rate $\epsilon^{[t]}_i$.

$$P^{[t]}_i = 1 - \epsilon^{[t]}_i \quad (7)$$

With the above-described processing, the discrimination precision of the filter is specified.

In step S707, the filter selection unit 107 selects the filter, and then updates the reliability of the filter and the weight of a learning sample based on the selected filter. Reliability $\alpha^{[t]}$ of the selected filter $f^{[t]}$ is calculated by the following formula.

$$\alpha^{[t]} = \frac{1}{2} \ln\left(\frac{1 - \epsilon^{[t]}}{\epsilon^{[t]}}\right) \quad (8)$$

In formula (8), $\epsilon^{[t]}$ is the error rate of the filter $f^{[t]}$. The weight of the learning samples is updated based on the reliability $\alpha^{[t]}$ calculated with formula (8).

$$D^{[t+1]}(x) = \frac{D^{[t]}(x)\exp(-\alpha^{[t]}L(x)h^{[t]}(x))}{Z^{[t]}} \quad (9)$$

In the formula (9), $Z^{[t]}$ is a normalization term calculated with the following formula.

$$Z^{[t]} = \Sigma D^{[t]}(x)\exp(-\alpha^{[t]}L(x)h^{[t]}(x)) \quad (10)$$

In step S709, the filter selection unit 107 determines whether the iterative processing of the filter selection in steps S704 to S708 ends, by using $T_{limit1}$ as an end condition. The filter selection unit 107 adds the calculation amount $T^{[t]}$ of the filter $f^{[t]}$ of selected in the t-th iterative processing to a sum $T^{[t-1]}_{estimate}$ of the calculation amount of the filter selected in the iterative processing by the (t−1)-th time, thereby acquiring $T^{[t]}_{estimate}$. The calculation amount stored in the filter node of the calculation order graph is used as $T^{[t]}$. When $T^{[t]}_{estimate}$ is more than $T_{limit1}$ with comparison between $T^{[t]}_{estimate}$ and $T_{limit1}$, the filter selection ends. If not so, the processing returns to step S704, in which the filter selection continues.

With the above-described processing, the information processing apparatus 10 calculates the reliability of the selected filter, and further updates the weight of the individual pixel in the set of learning images.

The above processing enables selecting the filter by using AdaBoost.

Finally, a description is given of processing upon extracting a region from the unknown image that is not included in the set of learning images by using selected filters $f^{[1]}, \ldots, f^{[Niter1]}$ in the above processing.

First, filters $f^{[1]}, \ldots, f^{[Niter1]}$ of the set of selection filters are applied to the unknown image, and feature amount images $G^{[1]}, \ldots, G^{[Niter1]}$ are generated. Further, binary images $g^{[1]}, \ldots, g^{[Niter1]}$ are generated from the feature amount image. This calculation processing is similar to that upon generating the binary images $h^{[1]}, \ldots, h^{[Niter1]}$ with formula (3). As thresholds upon generating the binary images $g^{[1]}, \ldots, g^{[Niter1]}$, the thresholds $S^{[1]}, \ldots, S^{[Niter1]}$ used upon generating the binary images $h^{[1]}, \ldots, h^{[Niter1]}$ are used. With the generated binary images $g^{[1]}, \ldots, g^{[Niter1]}$, the following formula is calculated for each pixel in the unknown image.

$$H(x) = \text{sign}\left(\sum_{t=1}^{Niter1} \alpha^{[t]} g^{[t]}(x)\right) \quad (11)$$

A function sign(p) gives 1 if p≥0 and returns −1 if p<0. When the value calculated with formula (11) is 1, the pixel is an extraction target. When the value is −1, the pixel is except for the extraction target.

According to the second exemplary embodiment, the calculation time of the feature amount is acquired with the calculation order graph. However, the present invention does not necessarily use the calculation order graph. Similar processing is possible with data on the reference of the filter application order.

According to the second exemplary embodiment, SVM and AdaBoost are used as the learning algorithm. Alternatively, the generation processing of the discriminator may be performed with an algorithm other than SVM and AdaBoost.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-272570 filed Nov. 30, 2009, which is hereby incorporated by reference herein in its entirety.

What is claimed is:

1. An information processing apparatus for determining feature types for a discriminator, the discriminator for discriminating a category of an image by inputting into the discriminator feature values of the determined feature types from the image, the information processing apparatus comprising:
   a memory for storing information indicating at least one determined feature type;
   a first obtaining unit configured to obtain a calculation amount for a process of applying a filter to obtain a feature value of a candidate feature type;
   a second obtaining unit configured to obtain a contribution degree, of the candidate feature type, to accuracy of discrimination; and
   a processing unit configured to determine a feature type from at least one candidate feature type based on the obtained calculation amount and the obtained contribution degree and to store information indicating the determined feature type on the memory;
   wherein the first obtaining unit is configured to obtain, as the calculation amount for the candidate feature type, in a case that the determined feature type stored in the memory is obtained by applying a first filter set including a first filter and a second filter set to the image in this order, and that the candidate feature type is obtained by applying at least the first filter set and a third filter set to the image in this order, a calculation amount for a process of applying the third filter set to the image, and
   wherein a feature value of the determined feature type is input into a discriminator.

2. The information processing apparatus according to claim 1, wherein the first obtaining unit is configured to calculate a calculation amount for the candidate feature type by ignoring a calculation amount for a process of applying the first filter set to the image.

3. The information processing apparatus according to claim 1, further comprising a determination unit configured to further determine a feature type based on whether a sum of calculation amount for obtaining the already determined feature type is more than a predetermined threshold.

4. The information processing apparatus according to claim 1, wherein the processing unit is configured not to further determine a feature type, if the feature type causes a sum of calculation amount for obtaining the already determined feature type to be more than a predetermined threshold.

5. The information processing apparatus according to claim 1, wherein an accuracy of a discriminator is determined based on feature types input into the discriminator.

6. The information processing apparatus according to claim 1, further comprising a generation unit configured to generate, by one of SVM and boosting algorithm, a discriminator whose input feature types are determined by the processing unit.

7. An information processing method for determining feature types for a discriminator, the discriminator for discriminating a category of an image by inputting into the discriminator feature values of the determined feature types from the image, the information processing method comprising:
   a first obtaining step of obtaining a calculation amount for a process of applying a filter to obtain a feature value of a candidate feature type;
   a second obtaining step of obtaining a contribution degree, of the candidate feature type, to accuracy of discrimination; and
   a determining step of determining a feature type from at least one candidate feature type based on the obtained calculation amount and the obtained contribution degree; and
   a storing step of storing information indicating the determined feature type on a memory;
   wherein in the first obtaining step, obtaining, as the calculation amount for the candidate feature type, in a case that the determined feature type stored in the memory is obtained by applying a first filter set including a first filter and a second filter set to the image in this order, and that the candidate feature type is obtained by applying at least the first filter set and a third filter set to the image in this order, a calculation amount for a process of applying the third filter set to the image, and
   wherein a feature value of the determined feature type is input into a discriminator.

8. A non-transitory computer-readable storage medium storing a program for causing a computer to perform the method of claim 7.

9. The information processing apparatus according to claim 6, further comprising:

a discrimination unit configured to discriminate target data with the generated discriminator, by applying filters to the image to obtain feature values of the determined feature types, and inputting the obtained feature values into the discriminator;

wherein the discrimination unit comprises:

an acquisition unit configured to acquire a feature values by applying filters in the predetermined order; and a storing unit configured to store the acquired feature value.

10. The information processing apparatus according to claim 9, further comprising a control unit performs control to stop acquiring a feature value depending on whether a calculation amount for calculating the feature values of the determined feature types is more than a predetermined threshold, and wherein the discrimination unit is configured to discriminate the unknown data by using the acquired feature values before the acquisition is stopped.

11. An information processing system including apparatuses, for determining feature types for a discriminator, the discriminator for discriminating a category of an image by inputting into the discriminator feature values of the determined feature types from the image, the information processing system comprising:

a memory for storing information indicating at least one determined feature type;

a first obtaining unit configured to obtain a calculation amount for a process of applying a filter to obtain a feature value of a candidate feature type;

a second obtaining unit configured to obtain a contribution degree, of the candidate feature type, to accuracy of discrimination; and a processing unit configured to determine at least one feature type from at least one candidate feature type based on the obtained calculation amount and the obtained contribution degree and to store information indicating the determined feature type on the memory;

wherein the first obtaining unit is configured to obtain, as the calculation amount for the candidate feature type, in a case that the determined feature type stored in the memory is obtained by applying a first filter set including a first filter and a second filter set to the image in this order, and that the candidate feature type is obtained by applying at least the first filter set and a third filter set to the image in this order, a calculation amount for a process of applying the third filter set to the image, and wherein a feature value of the determined feature type is input into a discriminator.

12. An information processing apparatus for determining feature types for a discriminator, the discriminator for discriminating a category of an image by inputting into the discriminator feature values of the determined feature types from the image, the information processing system comprising:

a processor; and a memory for storing information indicating at least one determined feature type, the memory storing a program including instructions executed by the processor to perform the method including:

a first obtaining step of obtaining a calculation amount for a process of applying a filter to obtain a feature value of a candidate feature type;

a second obtaining step of obtaining a contribution degree, of the candidate feature type, to accuracy of discrimination; and a determining step of determining a feature type from at least one candidate feature type based on the obtained calculation amount and the obtained contribution degree; and a storing step of storing information indicating the determined feature type on the memory, wherein in the first obtaining step, as the calculation amount for the candidate feature type, in a case that the determined feature type stored in the memory is obtained by applying a first filter set including a first filter and a second filter set to the image in this order, and that the candidate feature type is obtained by applying at least the first filter set and a third filter set to the image in this order, a calculation amount for a process of applying the third filter set to the image is obtained, and wherein a feature value of the determined feature type is input into a discriminator.

* * * * *